(12) United States Patent
Lin

(10) Patent No.: US 9,208,487 B2
(45) Date of Patent: Dec. 8, 2015

(54) CARD TRANSACTION DEVICE AND METHOD THEREOF

(71) Applicant: Smart Approach Co., Ltd., Hsinchu County (TW)

(72) Inventor: Hsin-Lung Lin, Hsinchu County (TW)

(73) Assignee: Smart Approach Co., Ltd., Hsinchu County (TW)

( * ) Notice: Subject to any disclaimer, the term of this patent is extended or adjusted under 35 U.S.C. 154(b) by 0 days.

(21) Appl. No.: 14/146,100

(22) Filed: Jan. 2, 2014

(65) Prior Publication Data

US 2015/0060541 A1 Mar. 5, 2015

(30) Foreign Application Priority Data

Sep. 3, 2013 (TW) .............................. 102131613 A

(51) Int. Cl.
*G06Q 20/34* (2012.01)
*G06Q 20/32* (2012.01)
*G07F 7/08* (2006.01)

(52) U.S. Cl.
CPC ........ *G06Q 20/3567* (2013.01); *G06Q 20/3227* (2013.01); *G06Q 20/3272* (2013.01); *G07F 7/0873* (2013.01)

(58) Field of Classification Search
CPC .. G06Q 20/3567; G06Q 20/34; G07F 7/0873; G07F 7/0886; G07F 7/08; G06K 7/084; G06K 7/0013

See application file for complete search history.

(56) References Cited

U.S. PATENT DOCUMENTS

| 7,810,729 | B2 | 10/2010 | Morley, Jr. | |
|---|---|---|---|---|
| 2003/0023554 | A1* | 1/2003 | Yap et al. ......................... | 705/43 |
| 2005/0035190 | A1* | 2/2005 | Nanbu et al. .................... | 235/379 |
| 2012/0061467 | A1* | 3/2012 | Tang et al. ...................... | 235/381 |
| 2014/0001264 | A1* | 1/2014 | Babu et al. ...................... | 235/440 |

* cited by examiner

*Primary Examiner* — Kristy A Haupt
(74) *Attorney, Agent, or Firm* — Alan D. Kamrath; Kamrath IP Lawfirm, P.A.

(57) ABSTRACT

A card transaction device is provided. And it's disposed in a smart phone, the smart phone includes a transaction processing application, and the card transaction device includes a credit card reader, a converter, a microcontroller, a plug, and a data register. The credit card reader is configured to read and encode basic information of a card, so as to generate a first encoded data. The converter is configured to convert the input data into an audio signal. The microcontroller is configured to control and manage the card reader and the converter. The microcontroller can reset the card reader and the converter, the plug is configured to plug into an audio hole of the smart phone, and the audio signal is transmitted through the audio hole to the smart phone.

12 Claims, 7 Drawing Sheets

CARD TRANSACTION DEVICE AND METHOD THEREOF

FIELD OF THE INVENTION

The present invention relates to a card transaction device and method thereof, and more particularly relates to a microcontroller card transaction device and method thereof.

BACKGROUND OF THE INVENTION

The traditional card trading machine is divided into two types: online transactions credit card machine and off-line credit card machine, the online transactions credit card machine must be installed to a fixed position and can be connected to a network, likes the credit card swipe machine in the shops. The off-line credit card machine even is no need to be installed to a fixed position and connected to the network, but still need to swipe the card transactions and thereafter connected to the back-end systems, is the way after connection to complete the credit card verification jobs, because the offline online credit card machine can not verify the validity of the card, thus making the risk of receivables relative increased. The off-line credit card machine is such as the credit card machines on the airplanes. For the online transactions credit card machine and the off-line credit card machine, in addition to the above-mentioned drawbacks, the credit card machine purchase costs are also high.

Currently, some of the publication discloses some technical features to improve the traditional problem of credit card machines, increase the convenience of card transactions, and also reduce the cost of the credit card machine, for example, the U.S. Pat. No. 7,810,729 "Card reader device for a cell phone and method of use" disclose a small card reader device to be connected on the smart phone's audio holes, make the smart phone instantly turn into a mobile credit card machine, which can be completed immediately for the online credit card transactions, but also easy to carry. The technology of the card reader device is mainly configured to transfer the card transaction data into audio signals and then transmit the audio signal to the smart phone, thereafter the smart phone restores the audio signal to become the card transaction data, and finally the data will be uploaded to the bank's database. Even though the U.S. Pat. No. 7,810,729 "Card reader device for a cell phone and method of use" has solve the problems of the traditional credit card machine cannot be easy to carry and cannot immediately instant the online credit card transaction, but the card reader device still has the following disadvantages:

1. When the card reader device reads the data of the card and transfers it into audio signal, it's likely to cause a crash, resulting in failure of credit card transactions, and thus requiring the user to restart the device for the device working properly.
2. The card's transaction digital information has been encoded through conversion once, so the encoded data after conversion is easier to be cracked, and is lack of security.

Therefore, how to design a card transaction device, to make the card transaction device in use effectively reduce the incidence of failure and increase the security of the transaction, is worthy to be considered by the person having ordinary skill in the art.

SUMMARY OF THE INVENTION

A card transaction device is provided and is electrically connected to an audio hole of a smart phone, in the smart phone installed a transaction processing application, and a card transaction device includes a card reader head, a converter, a microcontroller, a plug, and a data register. The card reader head is configured to read basic information of a card and then store the basic information in the data register, and the basic information will be encoded to generate a first encoded data. The converter is configured to convert the input data into an audio signal. The microcontroller is electrically connected between the card reader head and the converter, and the microcontroller is configured to manage the card reader head and the converter. The microcontroller can reset the card reader head or the converter. The plug is adapted to insert in the smart phone audio hole and the audio signals are transmitted through the audio hole to the smart phone.

The transaction processing application software can decode the audio signal and restore the audio signal into a first encoded data, and the transaction processing application software can generate a transaction information, the transaction processing application software can send the first coding information and transaction information through a telecommunications network to a remote database.

In the above card transaction device, the card is either debit card or the credit card.

In the above card transaction device, the data register is a random access memory.

In the above card transaction device, the microcontroller is configured to encode the first encoded data to generate a second encoded data, and the second encoded data will turn into the audio signals after the converter.

The above card transaction device further includes a battery and a set of warning lights, the battery is configured to supply the power to the card transaction device, and the warning lights are electrically connected to the micro controller, also includes a plurality of LED lamps, when the electric charge of the battery is less than a certain threshold value, the microcontroller will startup the warning light.

In the above card transaction device, the LED lamps includes a first color light LED, a second color light LED, and the third color light LED, when the battery is less than the certain threshold value, it will startup the first color light LED, when the card reader head reading the cards, it will startup the second color light LED, and when the card reader head in the standby mode it will startup the third color light LED.

The above card transaction device further includes a buzzer, when the card reader head reading the card, the buzzer to generates the "beep" sound.

In the above card transaction device, the card reader head is a non contact card reader head.

In the above card transaction device, the transaction processing application software is configured to encode the transaction information and then transmitted to a remote database.

The present invention provides a card transaction method, and comprising the steps of:
  a. Providing a card transaction device, and through a card reader head of the card transaction device to read a basic information of a card, and then save the basic information in the data register of the card transaction device, and the card transaction device is inserted in a audio hole on a smart phone.
  b. The basic information is encoded to a first encoded data.
  c. The first encoded data is encoded to a second encoded data by the microcontroller of the card transaction device.
  d. By a converter of the card transaction device, the second encoded data will be converted into an audio signal.

e. The audio signal is transmitted to the smart phone.

f. By the smart phone's transaction processing application software the audio signals can be decoded, and the audio signals will be restored to the first encoded data g. By the transaction processing application software a transaction information will be generated, h. Through the telecommunications network, the first coded data and the transaction information will be sent to a remote database, and The basic information of the card in the data register will be erased by the microcontroller.

In the above card transaction method, the card is debit card or credit card In the above card transaction method, the credit card reader head is by the near field communication method to read the credit card.

DETAILED DESCRIPTION OF PREFERRED EMBODIMENTS

Figure 1:
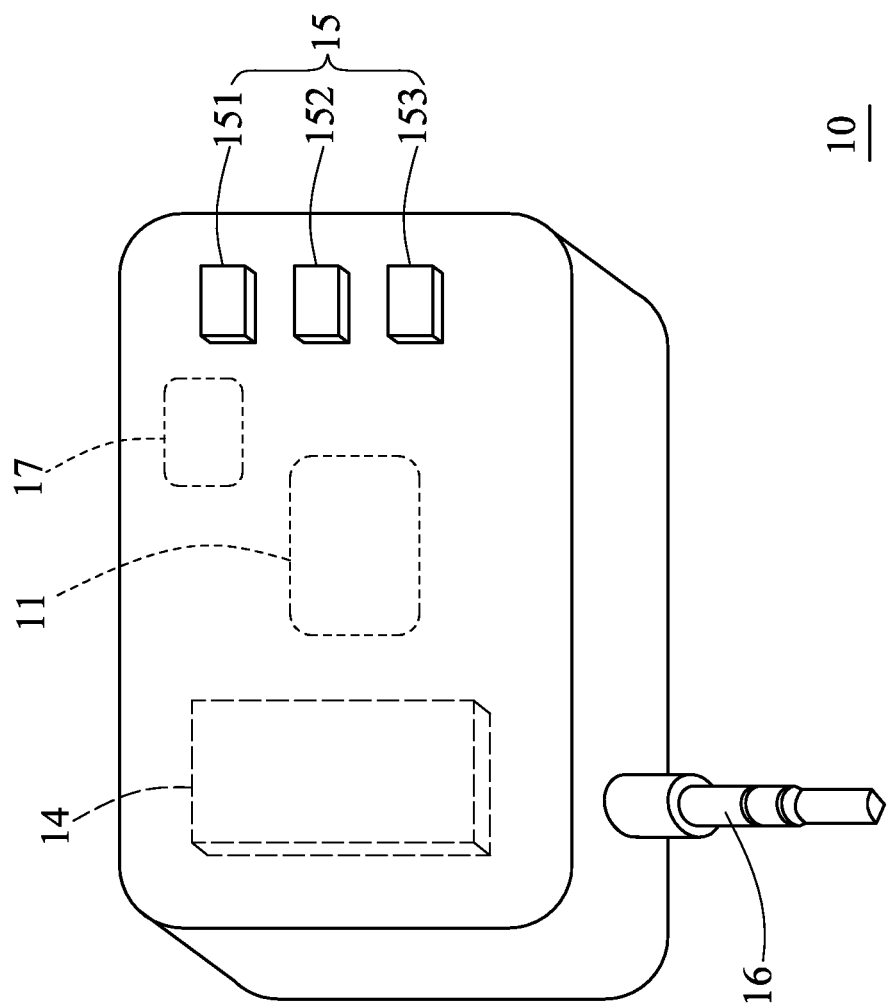
FIG. 1 shows an embodiment of the card transactions device 10.
Figure 2:
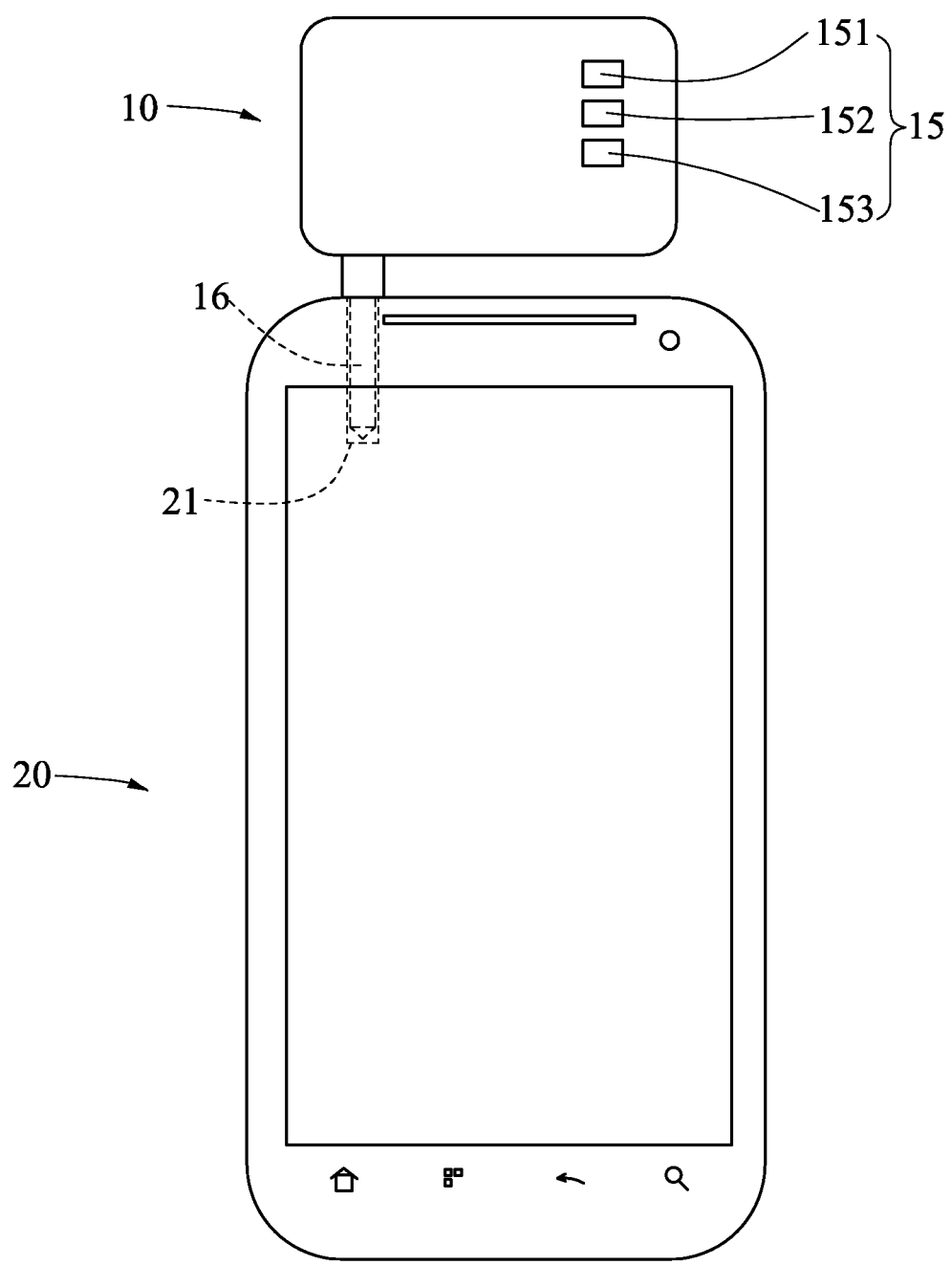
FIG. 2 shows an embodiment card transactions device 10 disposed on the smart phone 20.

Refer to FIG. 1 and FIG. 2, the FIG. 1 shows an embodiment of the card transactions device 10, FIG. 2 shows an embodiment card transactions device 10 disposed/mounted on the smart phone 20, the card transactions device 10 is a thin rectangular box-shaped body, it needs to connect with the smart phone 20 when it's using the card payment transactions, the card transactions device 10 includes a card reader head 11, a converter 12, a microcontroller 13, a battery 14, a set of warning lights 15, a plug 16, and a data register 17, the warning lights 15 and plug 16 is disposed on the card transactions device 10 interface, and the card reader head 11, converter 12, microcontroller 13, battery 14, and the data register 17 is disposed in the card transactions device 10 internal. From the above, for example, the data register 17 is a random access memory.

Figure 3:
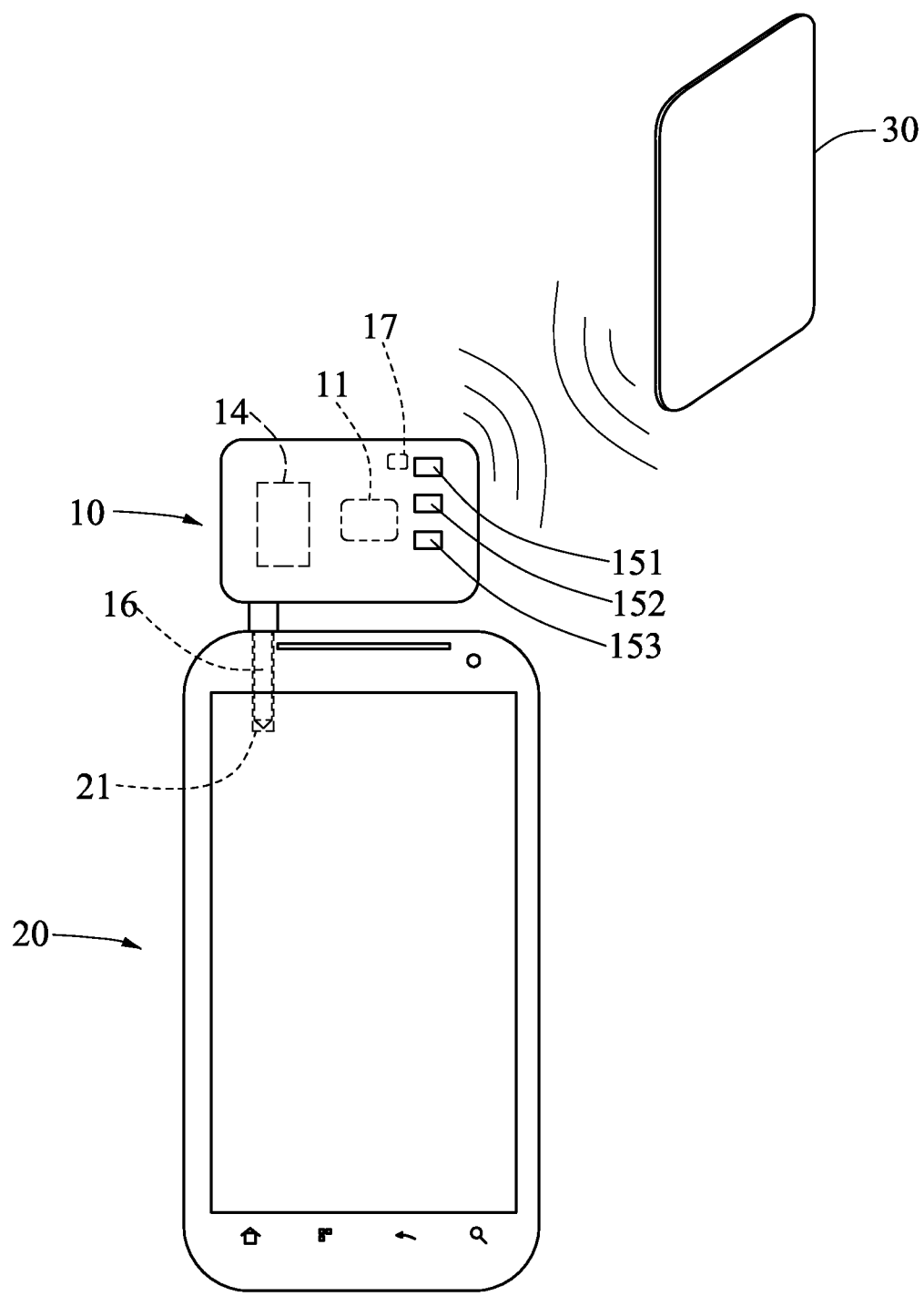
FIG. 3 and FIG. 4 shows a card transactions device 10 of an embodiment to reading the card 30.
Figure 4:
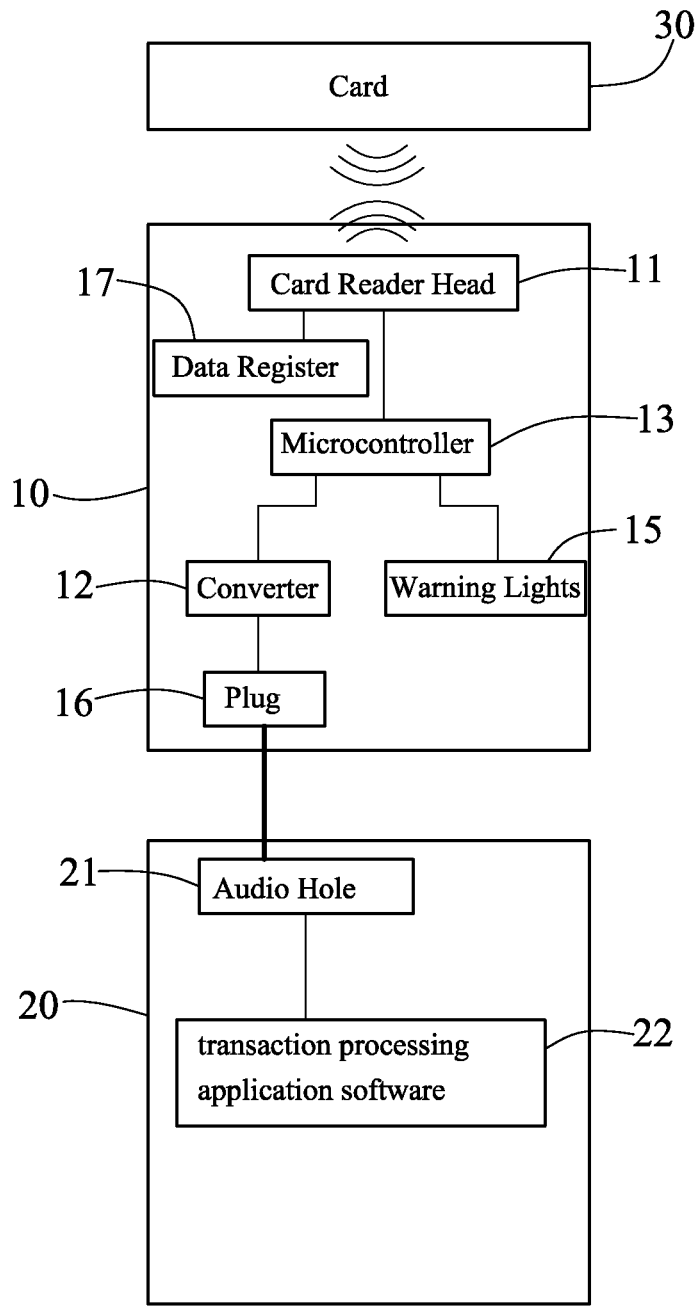

Refer to FIG. 3 and FIG. 4, FIG. 3 and FIG. 4 shows an embodiment of the card transactions device 10 to reading the card 30, the plug 16 of the card transactions device 10 has a length of 3.5 mm, when it is plugged into the audio hole 21 on the smart phone 20, the card transactions device 10 will closely connected to and fixed on the smart phone 20. The card reader head 11 is configured to reading the basic information of the card 30. The basic information of the card 30 includes: for example, the card holder's basic information, the card holder's contact information (cell phone number or E-mail address), the card number, and the expiration date of the card. The card reader head 11 is configured to save the basic information into the data register 17, and at the same time to encode the basic information to a first encoded data. The microcontroller 13 is mainly configured for timing detecting the card reader head 11, the converter 12, and the warning light 15, to check whether they are work properly. For example, the microcontroller 13 will detect once every 15 minutes, check if the card read head 11 is in the standby mode, if the card reader head is crashed or damaged, the microcontroller 13 will reset the card reader head immediately, i.e. the card reader head 11 will restart once, to help the card read head 11 back to the standby mode. Compared to the prior art's card reader device, the card transactions device 10 of the embodiment uses the microcontroller 13 to control and manage the operation of the card reader head 11 and the converter 12, to make the failure of the card transaction device 10 not easily be happened while using the card transaction device 10 during the transactions, therefore, to lower the transaction failure chance during the transaction. From the above, the card 30, for example, might be the debit card, credit card, or data stored value cards.

Moreover, the microcontroller 13 will encode the first encoded data from the card reader head 11 again and to generate a second encoded data, then the second encode data will be passed through the converter 12 to be converted to a audio signal, and the audio signal will be sent to the smart phone 20 through the plug 16. During the audio signals transmitted via the plug 16 to the smart phone 20, the smart phone's Trojans may steal audio signals from the audio hole, but because the card transaction device 10 has already encoded the credit card's information twice (that is: the first encoding and second encoding), so even if the audio signal is been stolen, it is not easy to restore the credit cards information.

The power of the card transactions device 10 of the embodiment is supplied from the built-in battery 14, using the lithium is the best way for the battery 14. If the battery 14 does not supply the power to the data register 17, then basic information data of the card 30 saved in the data register 17 will be disappeared. The LED lamps 15 includes a first color light LED 151, a second color light LED 152, and the third color light LED 153, when the electric charge of the battery 14 is less than ¼, the microcontroller 13 will lights the first color light LED 151, and make it bright to remind the users to charge the card transaction device 10. When the card reader head 11 reading the card 30, the microcontroller 13 will lights the second color light LED 152, so the user will knows that the card reader head 11 is reading the credit card's information. When the card reader head 11 is on the standby mode, the microcontroller 13 will lights the third color light LED 153, so the user can find out whether the card transaction device 10 works properly. Farther, the smart phone 20 needs to install a transaction processing application software 22, and the transaction processing application software 22 can decoded the audio signal converted by the converter 12, so that the audio signal can be restored into the first encoded data, and the transaction processing application software 22 via the user to enter an information (such as a credit card amounts) to generates a transaction information, the transaction processing application software 22 via a telecommunications network to send the first encoded data and the transaction information to the remote database (such as bank credit certification center). In the above embodiment, the card reader head 11 is using the way of Near Field Communication (NFC) to read the data information from the card 30 chip, therefore, the card reader head 11 and the card 30 is no direct contact.

Figure 5:
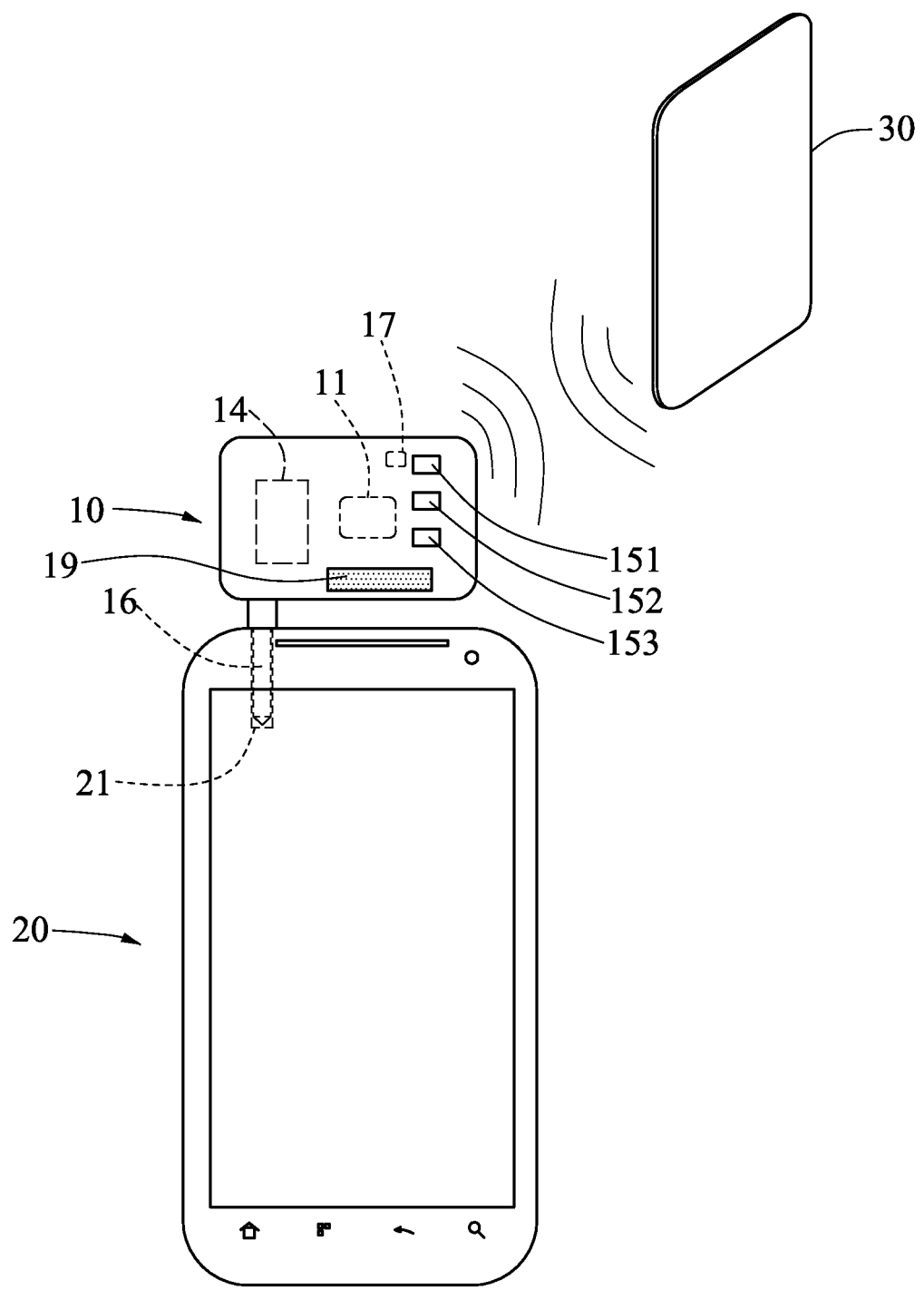
FIG. 5 shows card transactions device 10' of another embodiment to reading the card 30.

Refer to FIG. 5, the FIG. 5 shows another embodiment of the card transactions device 10' to reading the card 30. The card transactions device 10' further includes a buzzer 19, when the card reader head 11 reading the card 30, the microcontroller 13 not only switches on the second color light LED 152, but also switches on the buzzer 19, lights the second color light LED 152, and make the buzzer 19 to generates the "beep" sound.

Figure 6:
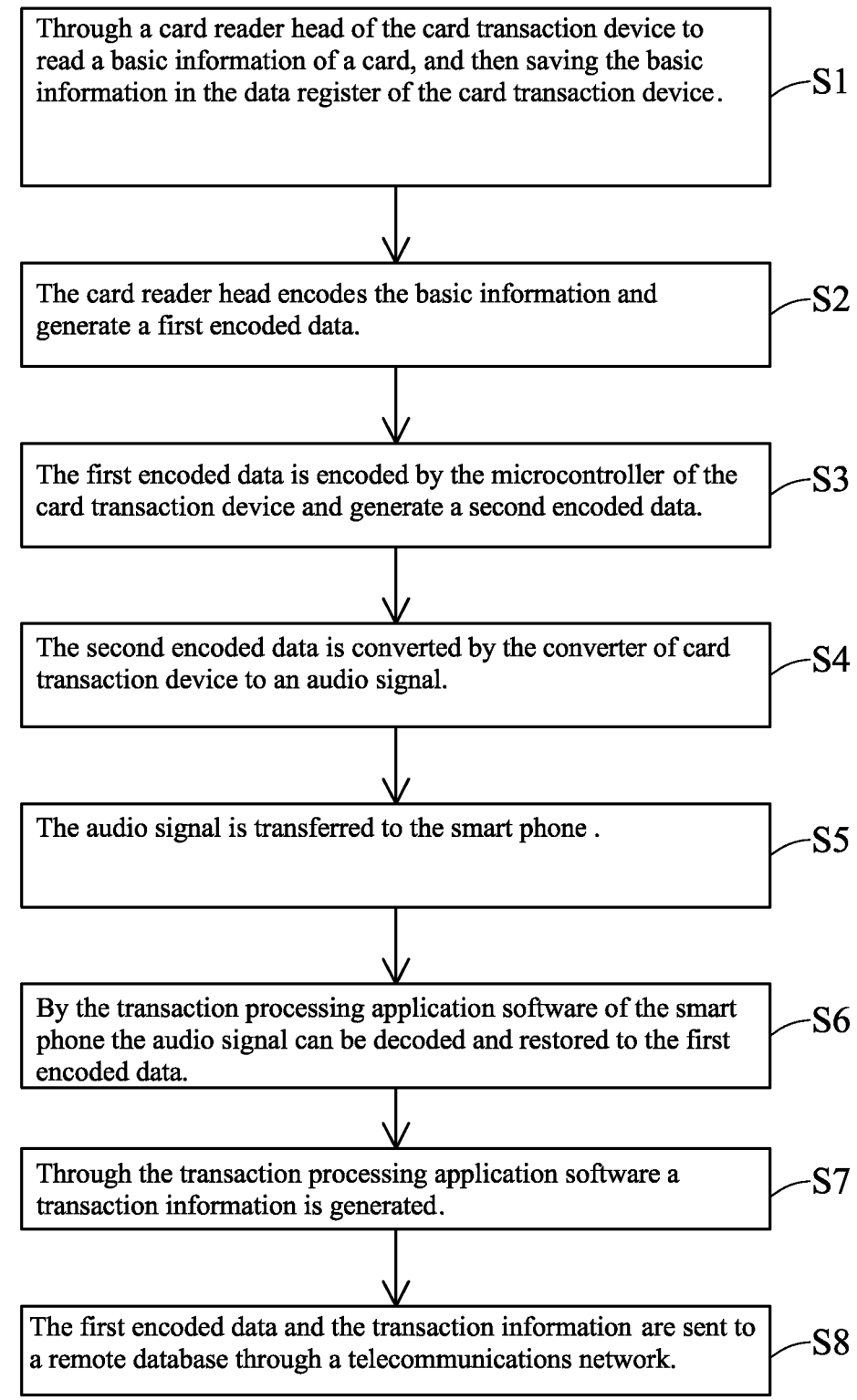
FIG. 6 shows a card transaction method's flowchart of an embodiment.
Figure 7:
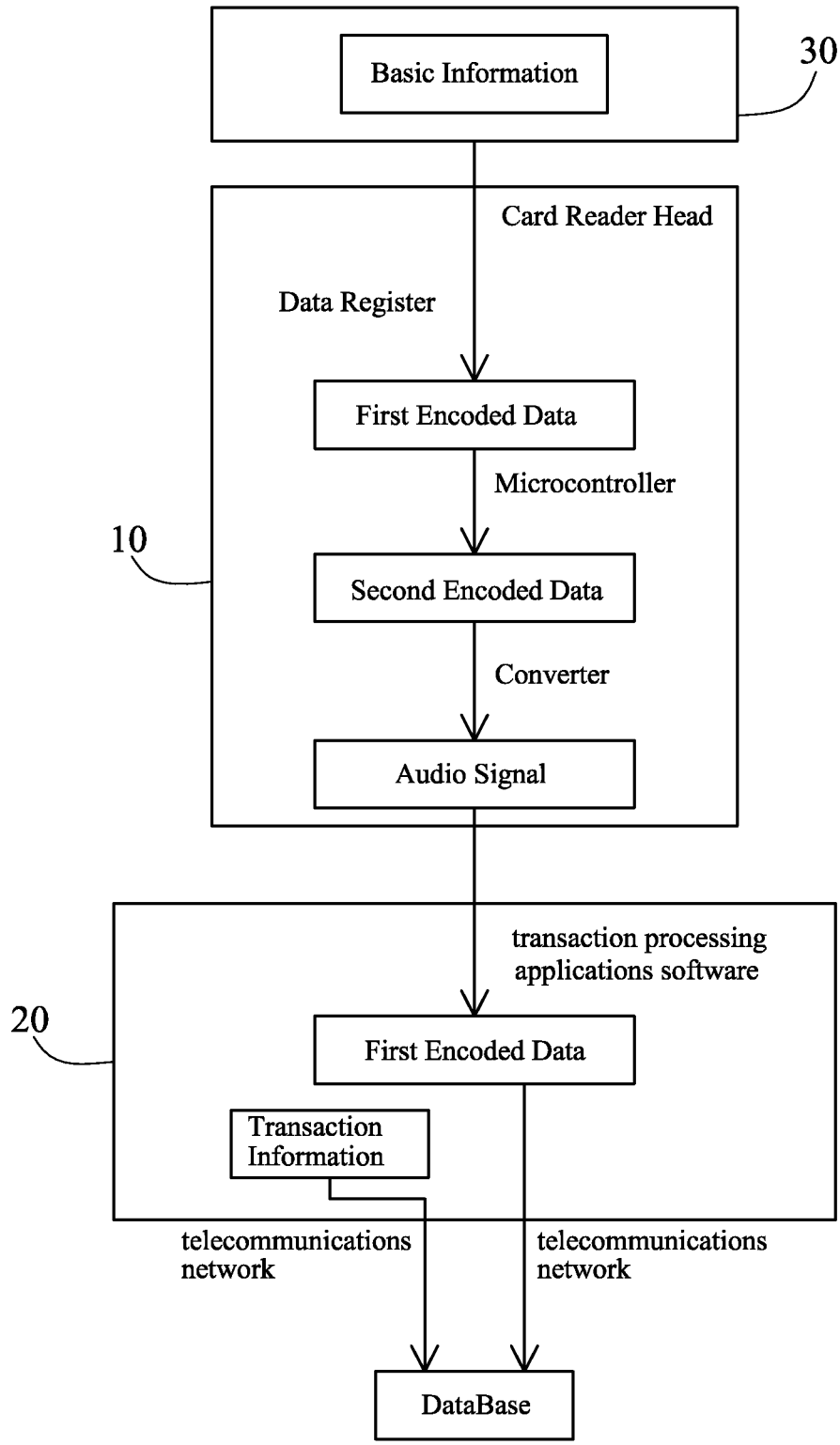
FIG. 7 shows a schematic diagram of the transmission and transformation of the basic information of the card 30.

Refer to FIG. 6 and FIG. 7, the FIG. 6 shows a flow chart of the card transaction method, the FIG. 7 shows the transmission and transformation of the basic information of the card 30. The credit card transaction method of the embodiment comprises the steps of: first, as described in step S1, the card transaction device 10 in the FIG. 1 is plugged into the audio hole 21 on the smart phone 20 and use the card reader head 11 of the card transaction device 10 to read the basic information stored in the card 30, and save the data information into the data register 17 of the card reader head 11, the card transaction device 10. Next, as described in step S2, the card reader head 11 will encode the basic information and generate a first encoded data. Then, as described in step S3, the first encoded data is encoded by the microcontroller 13 of the card transaction device 10 and generate a second encoded data. Then, as described in step S4, the second encoded data is converted by the converter 12 of card transaction device 10 to an audio signal. Then, as described in step S5, the audio signal is transferred to the smart phone 20. After that, as described in step S6, by the transaction processing application software 22 of the smart phone 20 the audio signal can be decoded and restored to the first encoded data. Then, as described in step S7, through the transaction processing application software 22 a transaction information is generated, and then, as described in step S8, the first encoded data and the transaction information will be sent to a remote database through a telecommunications network. Following the step S1~S8 will complete the payment transaction of the card 30. After that, the transaction processing application software 22 will create a electronic receipts based on the costs incurred by the trading information to, and then through the telecommunications network to send the electronic receipt to the mailbox or the mobile phone of the card user. In the embodiment, after completing the payment transaction of card 30, the basic information of the card in the data register 17 will be erased by the microcontroller 13.

In summary, the card transaction device 10 of the present invention via the microcontroller 13 will regularly detects whether the card reader head 11 and the converter 12 is functioning correctly, when the card reader head 11 and the converter 12 crash, the microcontroller 13 will reset the card reader head 11 and the converter 12, so when the user using the card transaction device 10 making the transactions, the chance of failure of the card transaction device 10 will be lowered. In addition, because the card transaction device 10 will encode the card 30 information twice, the audio signal is not easily tracked by the other malware and to be restored to the basic information of the card 30, thus it will have the higher security and confidentiality while using the card transaction device 10 to make the payment transactions.

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

What is claimed is:

1. A card transaction device, electrically connected to an audio hole of a smart phone, the card transaction device comprising:
   a data register;
   a card reader head reading basic information of a card and then storing the basic information in the data register, and the card reader head encoding the basic information to generate a first encoded data;
   a converter converting the input data into an audio signal;
   a microcontroller electrically connected between the card reader head and the converter, the microcontroller managing the card reader head and the converter, and the microcontroller resetting the card reader or the converter; and
   a plug plugging into the audio hole of the smart phone, and the audio signal transmitted through the audio hole to the smart phone;
   wherein a transaction processing application is installed in the smart phone and the transaction processing application software decodes the audio signal and restores the audio signal into a first encoded data, the transaction processing application software generates a transaction information, and the transaction processing application software sends the first coding information and transaction information through a telecommunications network to a remote database.

2. The card transaction device of claim 1, wherein the card is either a debit card or a credit card.

3. The card transaction device of claim 1, wherein the data register is a random access memory.

4. The card transaction device of claim 1, wherein the microcontroller encodes the first encoded data to generate a second encoded data, and the second encoded data is turned into the audio signals after passing through the converter.

5. The card transaction device of claim 1, further comprising:
   a battery, supplying the power to the card transaction device; and
   a set of warning lights, electrically connected to the micro controller, the warning lights comprising a plurality of LED lamps, wherein when the electric charge of the battery is less than a certain threshold value, the microcontroller is startup at least one of the warning light.

6. The card transaction device of claim 5, wherein the LED lamps includes a first color light LED, a second color light LED, and the third color light LED, the first color light LED is startup when the battery is less than the certain threshold value, the second color light LED is startup when the card reader head reading the cards, and the third color light LED is startup when the card reader head in the standby mode.

7. The card transaction device of claim 6 further comprising a buzzer, wherein the buzzer generates the "beep" sound when the card reader head is reading the card.

8. The card transaction device of claim 1, wherein the card reader head is a non contact card reader head.

9. The card transaction device of claim 1, wherein the transaction processing application software encodes the transaction information and then transmit the transaction information to a remote database.

10. A card transaction method, comprising:
    providing a card transaction device, a plug of the card transaction device inserted into a audio hole on a smart phone, through a card reader head of the card transaction device to read a basic information of a card, and then saving the basic information in the data register of the card transaction device;
    encoding the basic information to a first encoded data;
    encoding the first encoded data to a second encoded data by a microcontroller of the card transaction device;
    converting the second encoded data into an audio signal by a converter of the card transaction device;
    transmitting audio signal to the smart phone;
    decoding the audio signal by transaction processing application software installed in the smart phone, so as to restore the audio signal to the first encoded data;

generating a transaction information by transaction processing application software;

sending a first coded data and a transaction information to a remote database by the telecommunications network; and erasing the basic information of the card in the data register by the microcontroller.

11. The card transaction device of claim 10, wherein the card is a debit card or a credit card.

12. The card transaction device of claim 10, wherein the credit card reader head is by the near field communication method to read the credit card.

\* \* \* \* \*